(12) United States Patent
Wu (10) Patent No.: US 7,946,877 B2
(45) Date of Patent: May 24, 2011

(54) HOOK STRUCTURE OF COMPACT FLASH CARD

(75) Inventor: Jing Yuan Wu, Shing Tien (TW)

(73) Assignee: Moxa Inc., Shing Tien (TW)

( * ) Notice: Subject to any disclaimer, the term of this patent is extended or adjusted under 35 U.S.C. 154(b) by 56 days.

(21) Appl. No.: 12/288,698

(22) Filed: Oct. 21, 2008

(65) Prior Publication Data

US 2010/0099304 A1  Apr. 22, 2010

(51) Int. Cl.
*H01R 13/627* (2006.01)

(52) U.S. Cl. .......................................... 439/362; 439/484

(58) Field of Classification Search ................... 439/362, 439/483, 478, 479, 484
See application file for complete search history.

(56) References Cited

U.S. PATENT DOCUMENTS

| | | | | |
|---|---|---|---|---|
| 5,434,743 A | * | 7/1995 | Hosoya et al. | 361/679.32 |
| 6,905,067 B2 | * | 6/2005 | Boldt et al. | 235/451 |
| 6,918,177 B2 | * | 7/2005 | Haager et al. | 29/832 |
| 7,025,623 B2 | * | 4/2006 | Katsumata et al. | 439/483 |
| 7,654,847 B2 | * | 2/2010 | Soubh et al. | 439/329 |
| 7,726,987 B2 | * | 6/2010 | Chen | 439/148 |
| 2008/0299824 A1 | * | 12/2008 | Legg | 439/595 |

* cited by examiner

*Primary Examiner* — Hien Vu

(74) *Attorney, Agent, or Firm* — Stevens Law Group; David R. Stevens (57) ABSTRACT

A hook structure of the compact flash card has a supporting part and an extension part. The hook part extended from the extension part holds the compact flash card. The supporting part supports the compact flash card. It enables one to quickly and conveniently insert or withdraw the compact flash card on an industry computer. This solves the problems in the prior art that the compact flash card cannot be conveniently inserted into or removed from an industry computer and that the compact flash card easily gets loose, resulting in the industry computer system crash. The hook structure enables convenient replacement of compact flash cards and ensures the stable operation of the industry computer.

5 Claims, 8 Drawing Sheets

HOOK STRUCTURE OF COMPACT FLASH CARD

BACKGROUND OF THE INVENTION

1. Field of Invention

The invention relates to an insertion/removal structure of the compact flash (CF) card and, in particular, to a hook structure of the CF card that can rapidly fix the CF card and enable a convenient insertion/removal.

2. Related Art

In the modern society, many electronic products have become lighter, more compact, more efficient and powerful. In particular, the industry computers are also more compact than the usual office or home computers due to their working environment.

The development in CF cards has evolved from small capacities in early times (32 MB, 64 MB, etc) to larger capacities (2 GB, 4 GB, etc). In addition to purely data storage, they have become an interface with extensible functions.

Therefore, the industry computer uses the extensible function interface of the CF card to achieve function extensions. This still keeps the compact feature thereof. Please refer to FIG. 1 that is a three-dimensional assembly view of the CF card and the industry computer in the prior art. A conventional industry computer mainly has a motherboard 51 including a central processing unit (CPU, not shown), memory (not shown), and an input/output interface element 52, all integrated inside a shell (not shown). Therefore, given the limited memory space, its functions are also restricted.

Figure 1:
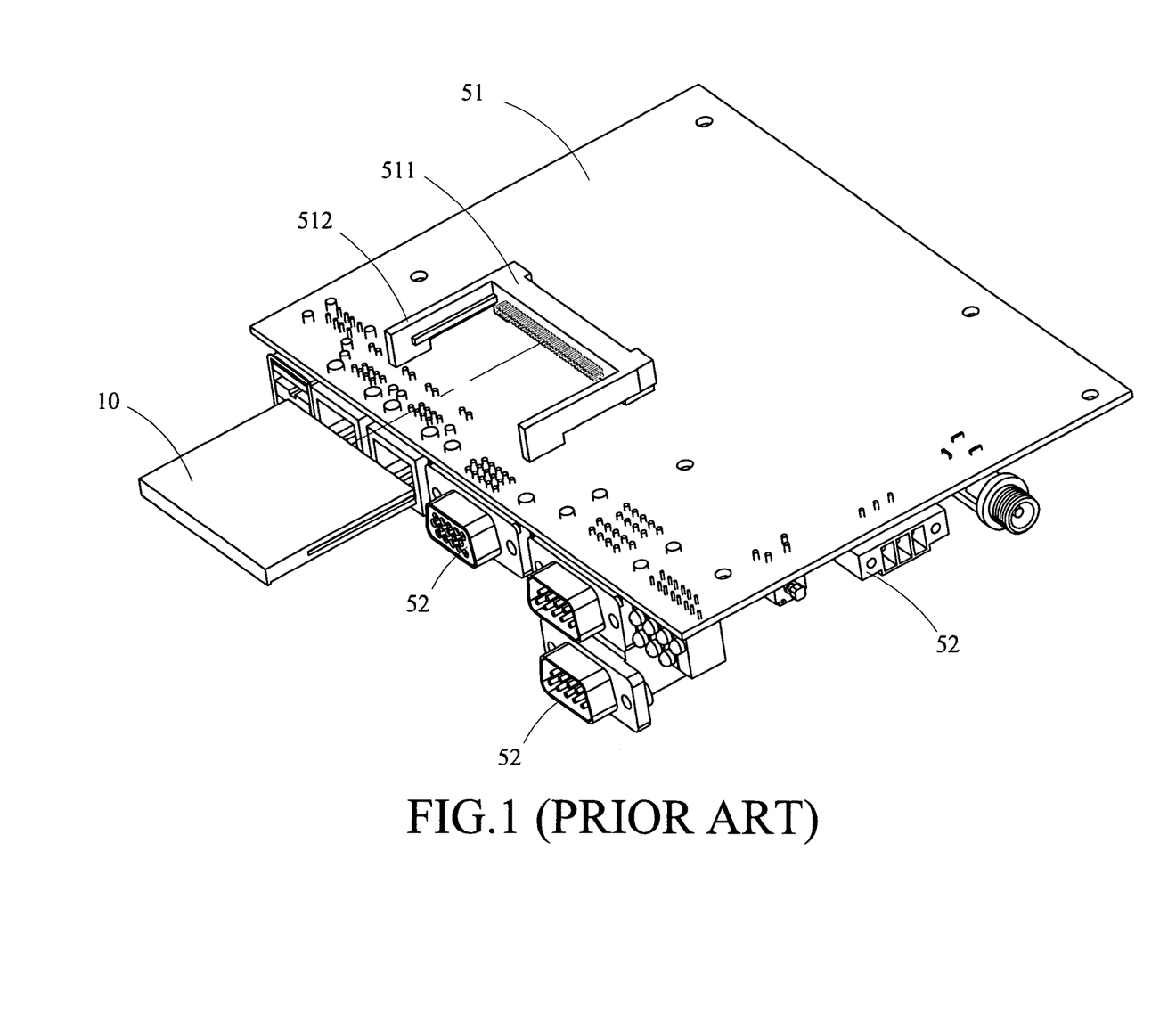
FIG. 1 is a three-dimensional assembly view of the CF card and the industry computer in the prior art.

Thanks to the rapid development in the CF card 10, the high capacity of the CF card 10 enables the industry computer to extend its functions by storing extension programs. That is, the functions of an industry computer can be extended using the CF card 10.

In this case, the motherboard 51 needs to be equipped with CF card slots 511. The CF card slot 511 has a guiding bar 512 on both sides, so that a CF card 10 can be guided by the guiding bars 512 to be inserted into the slot 511 correctly.

However, the guiding bars 512 on both sides of the CF card slot 511 only have the function of guiding the CF card 10. They generally do not have the effect of fixing the CF card 10. Even after the CF card 10 is inserted into the slot, the fixing effect is still very limited. Therefore, the CF card 10 may become loose. When the industry computer is running, its system may crash if the CF card 10 gets off.

Usually under the consideration of better appearance, the industry computer is designed such that the CF card 10 does not protrude from the computer shell when it is inserted into the CF card slot 511. Therefore, when the user needs to extend the functions of the industry computer, the CF card 10 has to be manually inserted. As the CF card 10 does not protrude from the shell after the insertion, it cannot be readily removed manually. Some additional tool is required in order to replace the CF card 10. This makes the CF card replacement extremely inconvenient.

In summary, there have been the problems that the CF card cannot be conveniently inserted into or removed from an industry computer and that the CF card easily gets loose, resulting in the industry computer system crash. It is thus necessary to provide a better technique to solve these problems.

SUMMARY OF THE INVENTION

In view of the foregoing, the invention discloses a hook structure of the CF card.

According to a first embodiment, the disclosed hook structure of the CF card applies to the CF card. The CF card has a protruding part. The hook structure includes: a substrate, an extension board, and a supporting board.

Both sides of the substrate have fixing elements disposed on the outer surface thereof. The surface opposite to the outer surface is defined as a base surface.

The extension board is fixed on the base surface of the substrate. At least one hook part extends from the upper side of the extension board and in the direction perpendicular to the base surface. The hook part hooks and holds the protruding part of the CF card.

The supporting board is perpendicular to the base surface and fixed on the substrate or the extension board. The supporting board supports the CF card when the hook part hooks and holds its protruding part.

In the second embodiment of the disclosed CF card hook structure for holding a CF card, the CF card has a protruding part and the CF card hook structure includes: a substrate and an extension board.

Both sides of the substrate have fixing elements disposed on the outer surface thereof. The surface opposite to the outer surface is defined as a base surface.

The extension board is fixed on the base surface of the substrate. At least one hook part extends from the upper side of the extension board and in the direction perpendicular to the base surface. The hook part hooks and holds the protruding part of the CF card. A supporting part extends from the lower side of the extension board in the direction perpendicular to the base surface. The supporting part supports the CF card when the hook parts hooks and holds the protruding part thereof.

In the third embodiment of the disclosed CF card hook structure for holding a CF card, the CF card has a protruding part and the CF card hook structure includes: a substrate and an extension board.

Both sides of the substrate have fixing elements disposed on the outer surface thereof. The surface opposite to the outer surface is defined as a base surface. A supporting part extends from the lower side of the substrate in the direction perpendicular to the base surface.

The extension board is fixed on the base surface of the substrate. At least one hook part extends from the upper side of the extension board in the direction perpendicular to the base surface. The hook part hooks and holds the protruding part of the CF card. The supporting part supports the CF card when the hook part holds the protruding part thereof.

In the fourth embodiment of the disclosed CF card hook structure for holding a CF card, the CF card has a protruding part and the CF card includes a substrate.

Both sides of the substrate have fixing elements disposed on the outer surface thereof. The surface opposite to the outer surface is defined as a base surface. At least one hook part extends from the upper side of the substrate in the direction perpendicular to the base surface. The hook part hooks and holds the protruding part of the CF card. A supporting part extends from the lower side of the substrate in the direction perpendicular to the base surface. The supporting part supports the CF card when the hook part holds the protruding part thereof.

The structure disclosed by the invention has been described above. Its main differences from the prior art are the supporting part and the extension part. The hook part on the extension part holds the CF card, and the supporting part supports the CF card. Therefore, the CF card can be more readily inserted into or removed from the CF card slot of an industry computer. Moreover, the CF card can be firmly fixed on the slot.

Using the disclosed technique, the invention can achieve the goals of replacing the CF card conveniently while maintaining a stable operation of the industry computer.

BRIEF DESCRIPTION OF THE DRAWINGS

The invention will become more fully understood from the detailed description given herein below illustration only, and thus is not limitative of the present invention, and wherein:

FIG. 2A is a three-dimensional view of the CF card that the invention can apply to;

DETAILED DESCRIPTION OF THE INVENTION

The present invention will be apparent from the following detailed description, which proceeds with reference to the accompanying drawings, wherein the same references relate to the same elements.

Figure 2A:
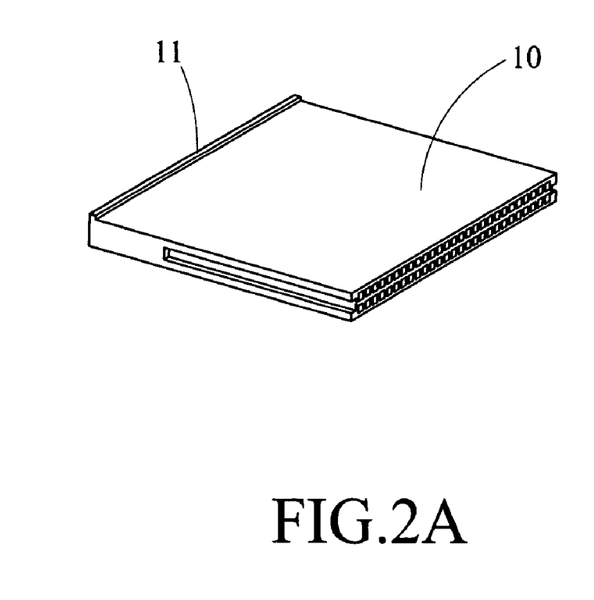
Figure 2B:
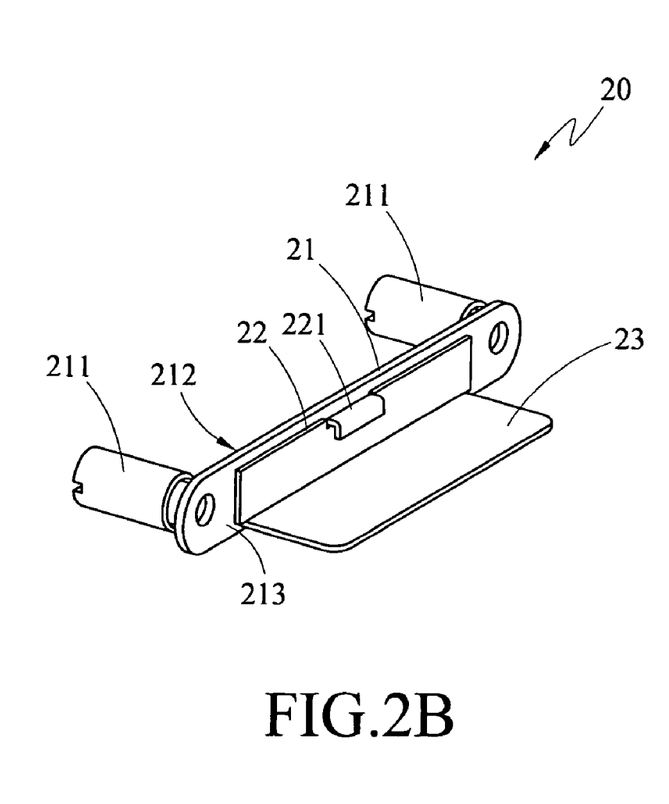
FIGS. 2B and 2C are three-dimensional views of the CF card hook structure according to the first embodiment.
Figure 2C:
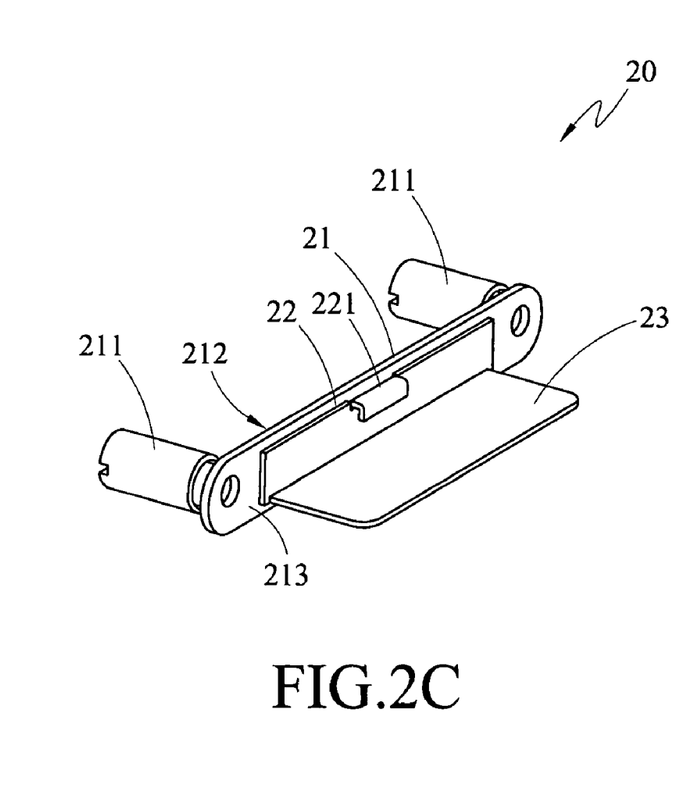

We first introduce the elements in the CF card hook structure according to a first embodiment of the invention, with reference to FIGS. 2A, 2B, and 2C. FIG. 2A is a three-dimensional view of the CF card that the invention can apply to. FIGS. 2B and 2C are three-dimensional views of the CF card hook structure in the first embodiment.

The CF card hook structure in this embodiment applies to a CF card 10. There are already standards in the product designs of CF cards 10. Therefore, there is always a protruding part 11 on the known CF card 10.

The CF card hook structure 20 includes: a substrate 21, an extension board 22, and a supporting board 23. Both sides of the outer surface 212 of the substrate 21 have fixing elements 211. The surface opposite to the outer surface 212 is defined as a base surface 213.

The above-mentioned fixing elements 211 include an elastic element and a screw (not shown). When the elastic element is not depressed by an external force, the screw is accommodated in the fixing element 211. When the elastic element is depressed by an external force, the screw protrudes from the fixing element and fastens into a bolt, thereby fixing the CF card hook structure. This is merely one example of the fixing element 211. The invention is not limited to this case. Any well-known fixing techniques, such as locking, buckling, and screwing, can all be used in the invention.

The extension board 22 is fixed on the base surface 213 of the substrate 21. At least one hook part 221 extends from the upper side of the extension board in the direction perpendicular to the base surface 213. The hook part 221 hooks and holds the protruding part 11 of the CF card 10.

The method of fixing the extension board 22 on the base surface 213 can be achieved by gluing and soldering. The above-mentioned method is only one example of fixing the extension board 22 on the substrate 21, and should not be used to limit the scope of the invention.

The supporting board 23 is perpendicular to the base surface 21 and is fixed on the substrate 21 or the bottom surface of the extension board 22. The supporting board 23 supports the CF card 10 when the protruding part 11 thereof is held by the hook part 221.

In order for the CF card 10 to be firmly supported on the supporting board 23, the length and width of the supporting board have to be at least half of those of the CF card 10. However, the invention is not limited by this particular choice.

The difference between FIG. 2B and FIG. 2C is in the fixing position of the supporting board 23. In FIG. 2B, the supporting board 23 is fixed on the substrate 21. In FIG. 2C, the supporting board 23 is fixed on the extension board 22.

Figure 3:
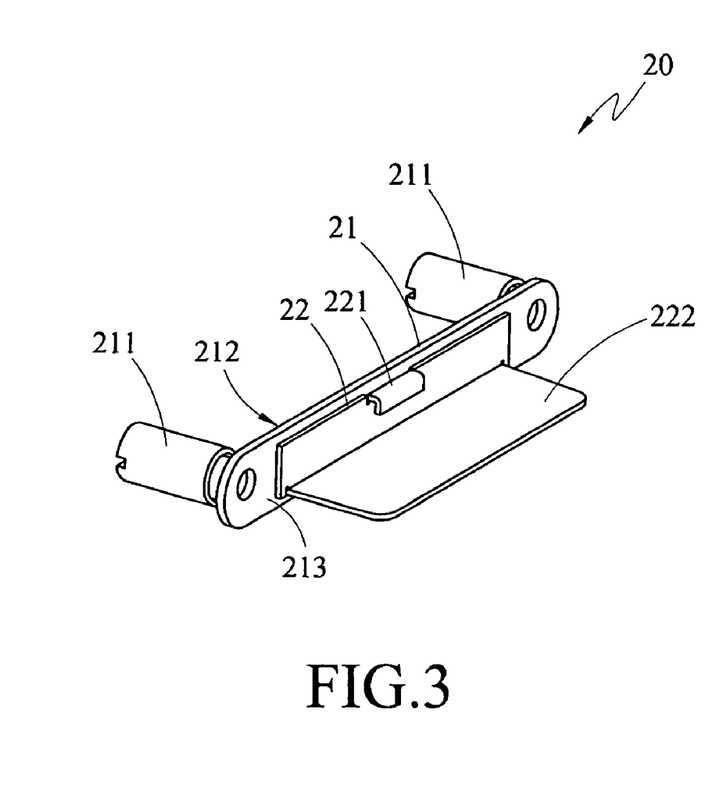
FIG. 3 is a three-dimensional view of the CF card hook structure according to the second embodiment.

The following describes the second embodiment of the invention. The difference between the elements in the CF card hook structure and those in the first embodiment is in the number of elements, as can be seen in FIG. 3. The first embodiment uses three elements to form the disclosed CF card hook structure. The second embodiment uses two elements to form the disclosed CF card hook structure. The supporting board 23 in the first embodiment becomes an extension of the extension board 22 in the second embodiment. Therefore, the second embodiment only requires two elements to form the disclosed CF card hook structure.

Consequently, the extension board 22 is fixed on the base surface 213 of the substrate 21. At least one hook part 221 extends from the upper side of the extension board 22 in the direction perpendicular to the base surface 213. The hook part 221 hooks and holds the protruding part 11 of the CF card 10. A supporting part 222 extends from the lower side of the extension board 22 in the direction perpendicular to the base surface 213. The supporting part 222 supports the CF card 10 when the hook part holds the protruding part 11 of the CF card 10.

Figure 4:
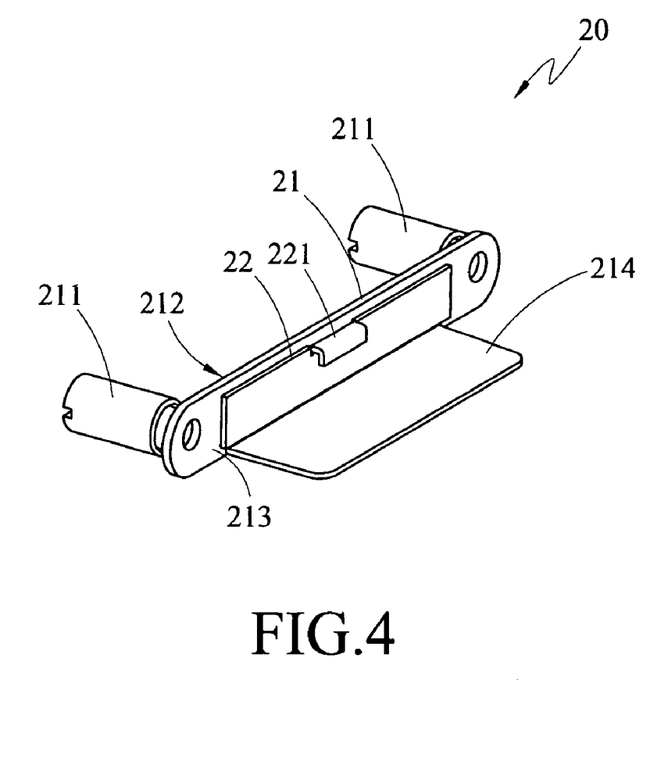
FIG. 4 is a three-dimensional view of the CF card hook structure according to the third embodiment.

The third embodiment of the invention is illustrated in FIG. 4. The difference between the third embodiment and the first embodiment is that: the first embodiment uses three elements to form the disclosed CF card hook structure, whereas the third embodiment uses only two elements. The supporting board 23 in the first embodiment becomes an extension from the substrate 21 in the third embodiment. Therefore, the third embodiment only requires two elements to form the disclosed CF card hook structure.

The difference between the third embodiment and the second embodiment is that: the supporting board 23 in the first embodiment is extended from the substrate 21 in the third embodiment, where it is extended from the extension board 22 in the second embodiment. They are thus structurally different.

Both sides of the substrate 21 have fixing elements 211 disposed on the outer surface 212 thereof. The surface opposite to the outer surface 212 is defined as the base surface 213.

A supporting part 214 extends from the lower side of the substrate 21 in the direction perpendicular to the base surface 213.

The extension board 22 is fixed on the base surface 213 of the substrate 21. At least one hook part 221 extends in the direction perpendicular to the base surface 213 for holding the protruding part 11 of the CF card 10. The supporting part 214 supports the CF card 10 when the hook part 221 hooks and holds the protruding part 11 of the CF card 10.

Figure 5:
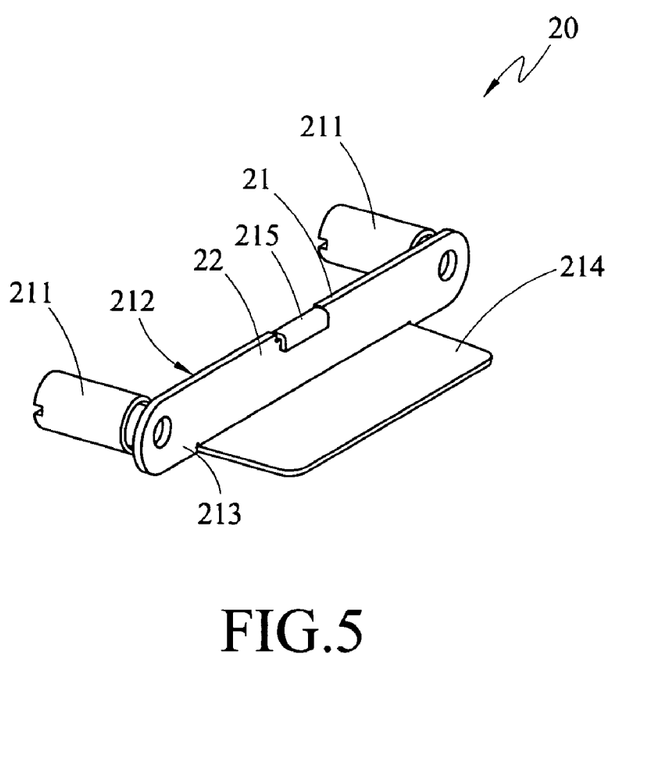
FIG. 5 is a three-dimensional view of the CF card hook structure according to the fourth embodiment.

The fourth embodiment of the invention is illustrated in FIG. 5. The difference between the fourth embodiment and the first embodiment is that: the first embodiment uses three elements to form the disclosed CF card hook structure, whereas the fourth embodiment uses only one element. The hook part 221 in the first embodiment is extended from the extension board 22. However, it is extended from the substrate 21 in the fourth embodiment. The supporting board 23 in the first embodiment becomes an extension from the substrate 21 in the fourth embodiment. Therefore, the fourth embodiment only requires one element to form the disclosed CF card hook structure.

The difference between the fourth embodiment and the second embodiment is that: the hook part 221 in the second embodiment is extended from the extension board 22, whereas it is extended from the substrate 21 in the fourth embodiment. The supporting board 23 in the first embodiment is extended from the substrate 21 in the fourth embodiment, whereas it is extended from the extension board 22 in the second embodiment. Therefore, they are structurally different.

The difference between the fourth embodiment and the third embodiment is that: the hook part 221 in the third embodiment is extended from the extension board 22, whereas it is extended from the substrate 21 in the fourth embodiment. The supporting board 23 in the first embodiment is extended from the substrate 21 in both the third and the fourth embodiments. Therefore, they are structurally different.

Both sides of the substrate 21 have fixing elements 211 disposed on the outer surface 212 thereof. The surface opposite to the outer surface 212 is defined as the base surface 213. At least one hook part 215 extends from the upper side of the substrate 21 in the direction perpendicular to the base surface 213 for holding the protruding part 11 of the CF card 10. A supporting part 213 extends from the lower side of the substrate 21 in the direction perpendicular to the base surface 213. The supporting part 214 supports the CF card 10 when the hook part 221 hooks and holds the protruding part 11 of the CF card 10.

The following describes other common features of the above-mentioned four embodiments. The first embodiment is also used as a basis to add new structural features.

Figure 6A:
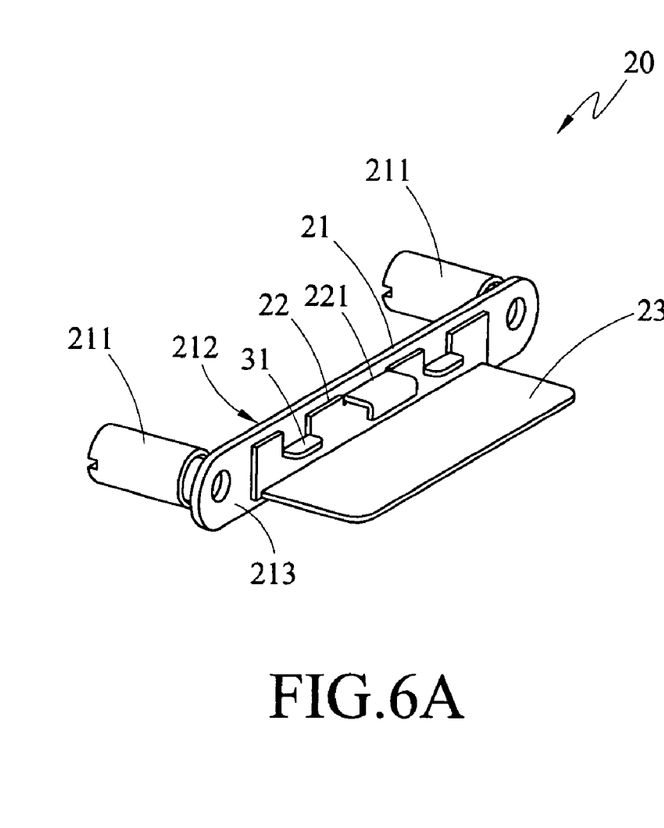
FIG. 6A is a three-dimensional view of the disclosed CF card hook structure with an urging part.
Figure 6B:
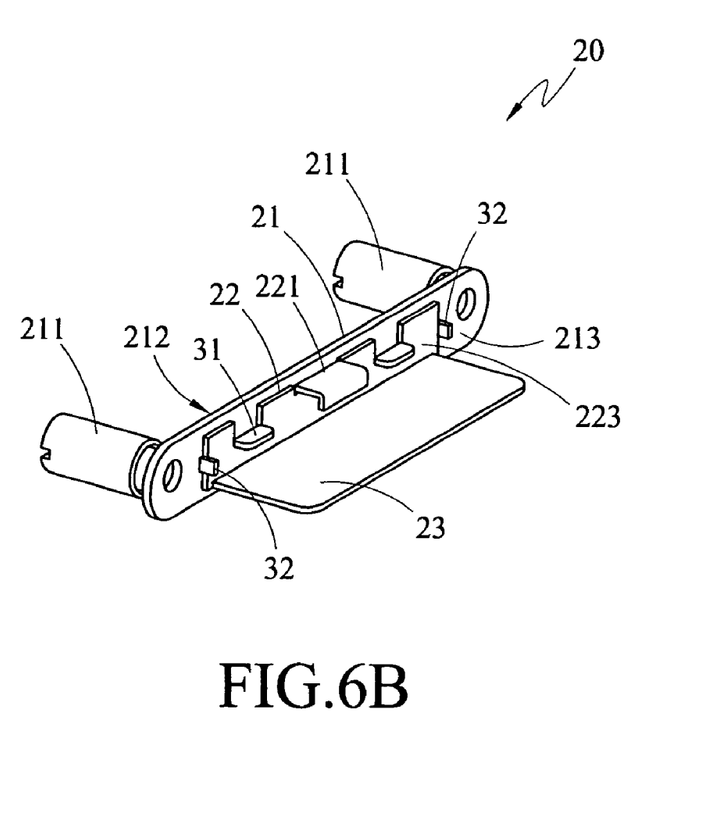
FIG. 6B is a three-dimensional view of the disclosed CF card hook structure with a limiting part.
Figure 6C:
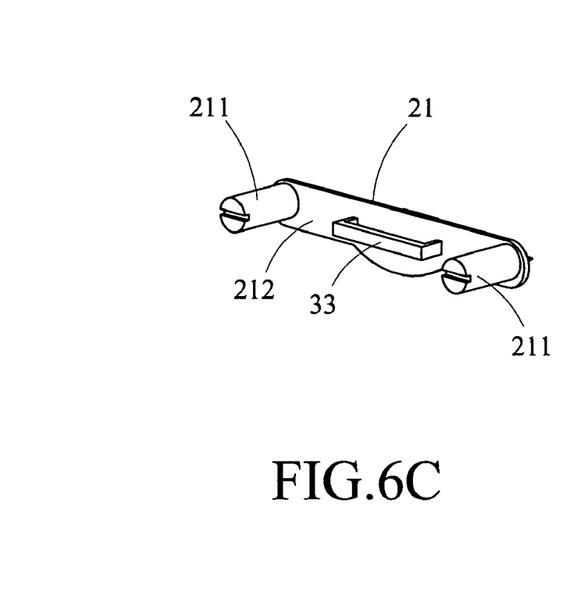
FIG. 6C is a three-dimensional view of the disclosed CF card hook structure with a holding part.

Please refer to FIGS. 6A, 6B, and 6C. FIG. 6A is a three-dimensional view of the disclosed CF card hook structure with an urging part. FIG. 6B is a three-dimensional view of the disclosed CF card hook structure with a limiting part. FIG. 6C is a three-dimensional view of the disclosed CF card hook structure with a holding part.

As shown in FIG. 6A, the disclosed CF card hook structure 20 further includes at least an urging part 31. In the first, second, and third embodiments, the urging part 31 extends from the extension board 22 in the direction perpendicular to the base surface 213. In the fourth embodiment, the urging part 31 extends from the substrate 21 in the direction perpendicular to the base surface 213.

Using the urging part 31 can increase the reserved space between the hook part 221 and the extension board 22 or between the hook part 215 and the substrate 21. When the CF card 10 is hooked, the urging part 31 helps the CF card 10 be accurately held by the hook part 221. At the same time, it enlarges the reserved space between the hook part 221 and the extension board 22 or between the hook part 215 and the substrate 21, so that there is sufficient space to rotate the CF card 10 for hooking or un-hooking. That is, it makes the assembly of the CF card 10 and the disclosed CF card hook structure 20 easier.

With reference to FIG. 6B, the disclosed CF card hook structure 20 further includes at least one limiting part 32. The limiting part 32 in FIG. 6B is disposed on the base surface 213 of the substrate 21. In addition to the base surface 213 of the substrate 21, the limiting part 32 in the first, second, and third embodiments can be disposed on the extension surface 223 of the extension board 22, the supporting board 23, or the supporting part 222. In the fourth embodiment, the limiting part 32 is disposed on the base surface 213 of the substrate 21 or the supporting part 214.

Using the limiting part 32, the CF card 10 can be rapidly positioned when it is connected with the disclosed CF card hook structure 20, so that the hooked CF card cannot have a horizontal displacement.

As shown in FIG. 6C, the disclosed CF card hook structure 20 further includes a holding part 33. In the first, second, third, and fourth embodiments, the holding part is disposed on the outer surface 212 of the substrate 21.

Through the holding part 33, the user can readily replace the CF card on the disclosed CF card hook structure 20. The holding part 33 can be disposed at the central position of the outer surface 212, so that the exerting force falls at the central position when one pulls the CF card 10 via the holding part 33. This can avoid the unbalance problem when replacing the CF card 10 through the fixing elements 211. The CF card 10 can thus be more smoothly replaced.

Embodiments of the invention can include some or all of the above-mentioned urging part 31, limiting part 32, and holding part 33 to enjoy different features. For example, the first embodiment simultaneously includes the urging part 31, the limiting part 32, and the holding part 33. The third embodiment has the urging part 31 and the limiting part 32 or the limiting part 32 and the holding part 33. The fourth embodiment only includes the urging part 31, and the second embodiment only includes the limiting part 32. The invention thus has many embodiments by various combinations of the above-mentioned implementations and structures.

After explaining the structure of and relations among the elements in the invention, the following describes how the CF card 10 and the disclosed CF card hook structure 20 are assembled according to the invention, with reference to FIGS. 7A, 7B, 7C, and 8.

Figure 7A:
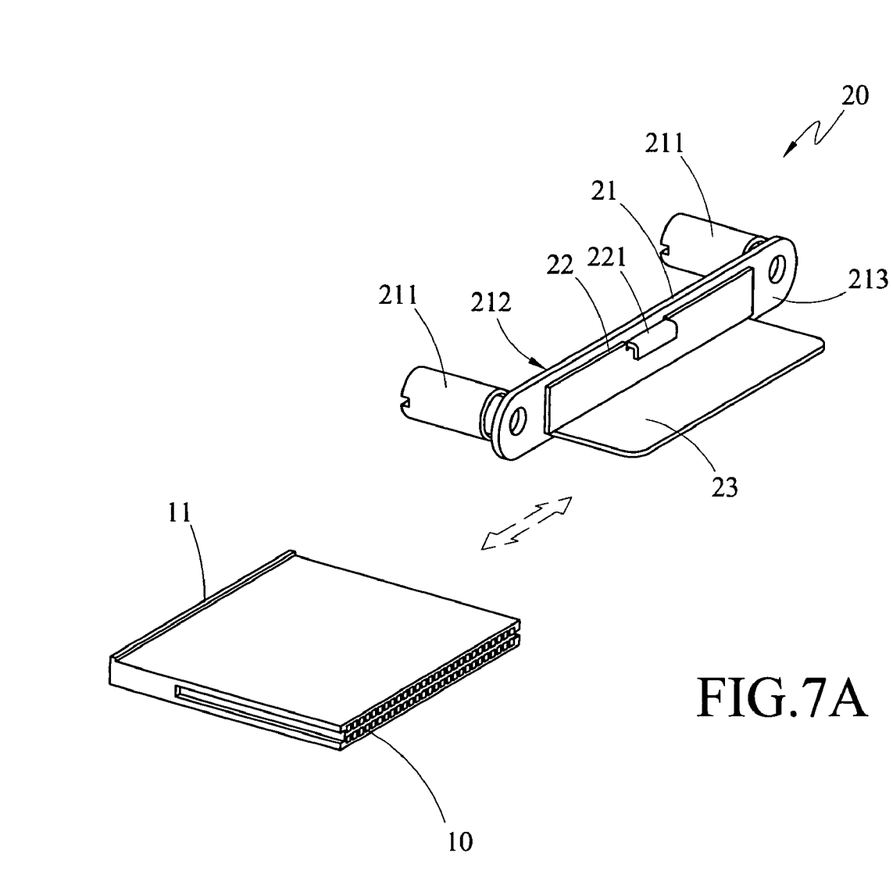
FIG. 7A is a three-dimensional view of a CF card and the disclosed CF card hook structure assembled in the first scheme.
Figure 7B:
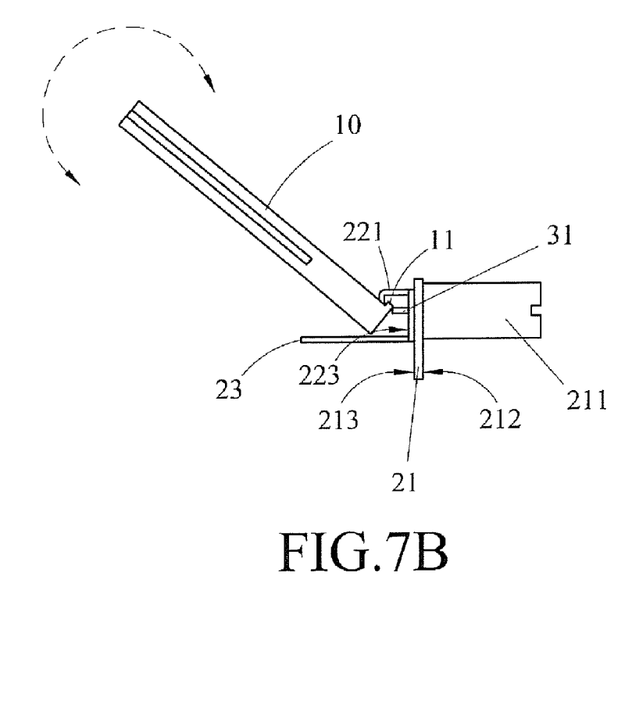
FIG. 7B is a planar side view showing the process of a CF card and the disclosed CF card hook structure being assembled in the second scheme.
Figure 7C:
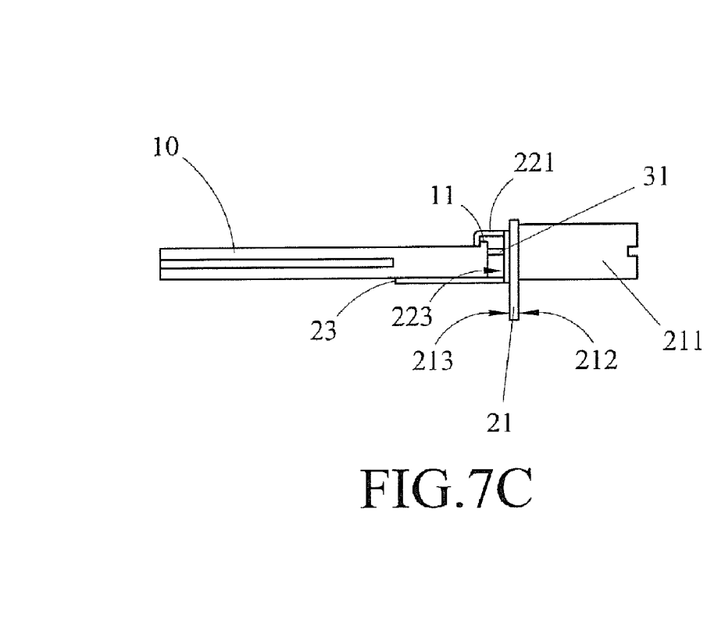
FIG. 7C is a planar side view of a CF card and the disclosed CF card hook structure assembled in the second scheme.
Figure 8:
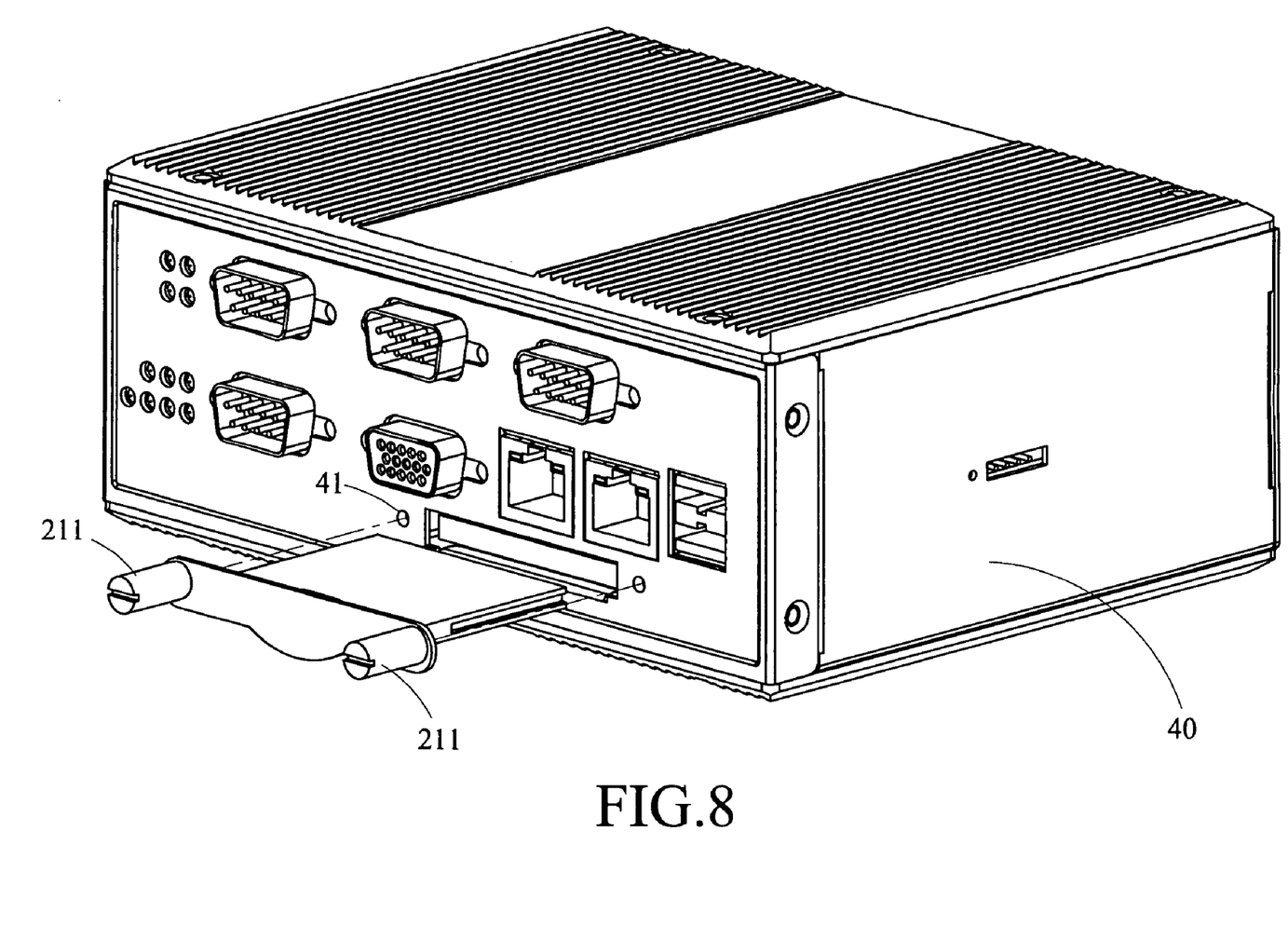
FIG. 8 is a three-dimensional assembly view of the CF card and the CF card hook structure according to the invention.

FIG. 7A is a three-dimensional view of a CF card and the disclosed CF card hook structure assembled in the first scheme. FIG. 7B is a planar side view showing the process of a CF card and the disclosed CF card hook structure being assembled in the second scheme. FIG. 7C is a planar side view of a CF card and the disclosed CF card hook structure assembled in the second scheme. FIG. 8 is a three-dimensional assembly view of the CF card and the CF card hook structure according to the invention.

As shown in FIG. 7A, the disclosed CF card hook structure 20 and the CF card 10 are along the horizontal direction of the base surface 213. Along the direction indicated by the arrow in FIG. 7A, the CF card 10 is inserted into or removed from the disclosed CF card hook structure 20. This is the first assembly method for the CF card 10 and the CF card hook structure 20.

With reference to FIG. 7B, the CF card 10 is first tilted by an angle. The protruding part 11 of the CF card 10 is disposed in the space between the hook part 221 and the base surface 213 or the extension surface 223. Afterwards, along the direction indicated by the arrow in FIG. 7B, the CF card 10 is rotated downwards and counterclockwise (as shown in the drawing). When the CF card 10 is flat on the supporting board 23 or the supporting part 214, the protruding part 11 thereof is exactly hooked by the hook part 221. This completes the process of assembling the CF card 10 onto the disclosed CF card hook structure 20. The result is shown in FIG. 7C.

The above-mentioned is the second method for assembling the CF card 10 and the CF card hook structure 20 according to the invention. Taking the CF card 10 out of the CF card hook structure 20 involves exactly the opposite operations. It is not further described herein.

Finally, please refer to FIG. 8. After the CF card 10 and the CF card hook structure 20 are assembled, one can use the CF card hook structure to readily insert the CF card 10 into an industry computer 40. Also, using the disclosed CF card hook structure, one can rapidly and conveniently replace the CF card 10. Consequently, the industry computer 40 can read data in the CF card 10 for performing various operations. By fixing the fixing elements 211 on the disclosed CF card hook structure 20 on the corresponding elements 41 on the industry computer 40, the CF card can be effectively prevented from loose contacts with the industry computer 40. Therefore, the industry computer 40 can operate stably without system crashes due to a loose CF card.

In summary, the differences between the invention and the prior art are a supporting part and an extension part. The hook part extended from the extension part hooks and holds the CF card. The supporting part supports the CF card. Therefore, when the CF card is inserted into or removed from the CF card slot of an industry computer, it can be rapidly and conveniently fixed or removed.

The disclosed technique can solve the problems that the CF card cannot be conveniently inserted into or removed from an industry computer and that the compact flash card easily gets loose, resulting in the industry computer system crash. The invention enables convenient replacement of CF cards and ensures the stable operation of the industry computer.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A compact flash (CF) card hook structure for holding a CF card having a protruding part, the structure comprising:
    a substrate having contacts thereon which an outer surface thereof has a fixing element disposed on each of two ends of the outer surface, the substrate has a base surface opposite to the outer surface being defined thereby; and
    an extension board, which is fixed on the base surface of the substrate, and has at least one hook part extending from an upper side edge of the extension board in the direction perpendicular to the base surface and one supporting board extending from a lower side edge of the extension board in the direction perpendicular to the base surface;
    wherein the hook part hooks mid holds the protruding part of the CF card, and the supporting board supports the CF card when the hook part holds the protruding part of the CF card in a complete assembly position.

2. The CF card hook structure of claim 1, wherein the extension board further includes at least one urging part perpendicular to the base surface.

3. The CF card hook structure of claim 1, wherein the length of the supporting board is in the range of between half and full length of the CF card, and the width of the supporting board is in the range of between half and full width of the CF card.

4. A CF card hook structure for holding a CF card having a protruding part, the structure comprising:
    a substrate having contacts thereon which an outer surface thereof has a fixing element disposed on each of two ends of the outer surface, the substrate has a base surface opposite to the outer surface being defined thereby, wherein a supporting board extends from a lower side edge of the substrate in the direction perpendicular to the base surface; and
    an extension board, which is fixed on the base surface of the substrate, and has at least one hook part extending from an upper side edge of the extension board in the direction perpendicular to the base surface;
    wherein the hook part hooks and holds the protruding part of the CF card, and the supporting board supports the CF card when the hook part holds the protruding part of the CF card in a complete assembly position.

5. The CF card hook structure of claim 4, wherein the length of the supporting board is in the range of between half and full length of the CF card, and the width of the supporting board is in the range of between half and full width of the CF card.

* * * * *